United States Patent
Jiang et al.

(10) Patent No.: US 10,726,568 B2
(45) Date of Patent: Jul. 28, 2020

(54) METHOD AND APPARATUS FOR MAP CONSTRUCTING AND MAP CORRECTING

(71) Applicant: GUANGZHOU AIROB ROBOT TECHNOLOGY CO., LTD., Guangzhou, Guangdong (CN)

(72) Inventors: Yujie Jiang, Guangdong (CN); Beichen Li, Guangzhou (CN)

(73) Assignee: GUANGZHOU AIROB ROBOT TECHNOLOGY CO., LTD., Guangzhou (CN)

( * ) Notice: Subject to any disclaimer, the term of this patent is extended or adjusted under 35 U.S.C. 154(b) by 142 days.

(21) Appl. No.: 16/123,132

(22) Filed: Sep. 6, 2018

(65) Prior Publication Data
US 2019/0005669 A1    Jan. 3, 2019

Related U.S. Application Data

(63) Continuation of application No. PCT/CN2016/075955, filed on Mar. 9, 2016.

(51) Int. Cl.
*G06K 9/00*     (2006.01)
*G06T 7/579*    (2017.01)
(Continued)

(52) U.S. Cl.
CPC .............. *G06T 7/579* (2017.01); *G01C 15/00* (2013.01); *G01C 21/005* (2013.01);
(Continued)

(58) Field of Classification Search
CPC .. G06T 7/579; G06T 7/80; G06T 7/74; G06T 11/00; G06T 2207/30204; G06F 16/00;
(Continued)

(56) References Cited

U.S. PATENT DOCUMENTS

| | | | |
|---|---|---|---|
| 7,684,894 B2 * | 3/2010 | Sakai | G05D 1/0246 700/245 |
| 9,939,814 B1 * | 4/2018 | Bauer | G05D 1/0246 |

(Continued)

FOREIGN PATENT DOCUMENTS

| | | |
|---|---|---|
| CN | 103439973 A | 12/2013 |
| CN | 104197930 A | 12/2014 |

OTHER PUBLICATIONS

Pestana, Jesús, et al. "Overview obstacle maps for obstacle-aware navigation of autonomous drones." Journal of field robotics 36.4 (2019): 734-762. (Year: 2019).*

*Primary Examiner* — Jonathan S Lee

(57) ABSTRACT

A method for map constructing, applicable for real-time mapping of a to-be-localized area provided with at least one laser device, includes taking a position of a mobile electronic as a coordinate origin of a map coordinate system, when a center of a mark projected by a first laser device coincides with central point of CCD/CMOS; moving the mobile electronic device with the coordinate origin as a starting point to traverse the entire to-be-localized area, calculating and recording coordinate values of a position of one of obstacles each time when it is detected by the mobile electronic device; and constructing a map based on recorded information of mark and corresponding coordinate values and the coordinate values of the position of each said obstacle after the traversing process is finished.

20 Claims, 6 Drawing Sheets

(51) Int. Cl.
*G01C 21/16* (2006.01)
*G06F 16/00* (2019.01)
*G01C 21/20* (2006.01)
*G01C 21/00* (2006.01)
*G05D 1/02* (2020.01)
*G01S 17/48* (2006.01)
*G06T 11/00* (2006.01)
*G01C 15/00* (2006.01)
*G01S 17/931* (2020.01)
*G06T 7/80* (2017.01)
*G06T 7/73* (2017.01)
*G06F 16/29* (2019.01)

(52) U.S. Cl.
CPC ......... *G01C 21/165* (2013.01); *G01C 21/206* (2013.01); *G01S 17/48* (2013.01); *G01S 17/931* (2020.01); *G05D 1/024* (2013.01); *G05D 1/0274* (2013.01); *G06F 16/00* (2019.01); *G06F 16/29* (2019.01); *G06T 7/74* (2017.01); *G06T 7/80* (2017.01); *G06T 11/00* (2013.01); *G06T 2207/30204* (2013.01)

(58) Field of Classification Search
CPC ....... G06F 16/29; G01C 15/00; G01C 21/005; G01C 21/165; G01C 21/206; G01S 17/931; G01S 17/48; G05D 1/024; G05D 1/0274
USPC .......................................................... 382/103
See application file for complete search history.

(56) References Cited

U.S. PATENT DOCUMENTS

| | | | |
|---|---|---|---|
| 9,946,264 B2* | 4/2018 | Liao | G05D 1/0253 |
| 10,012,733 B2* | 7/2018 | Barrows | H04B 10/60 |
| 10,542,859 B2* | 1/2020 | Lee | A47L 9/2852 |
| 10,549,430 B2* | 2/2020 | Nakata | B25J 13/089 |
| 10,551,844 B2* | 2/2020 | Biber | G05D 1/0274 |
| 10,562,184 B2* | 2/2020 | Yamamoto | G06Q 50/12 |
| 10,571,277 B2* | 2/2020 | Li | G01C 21/206 |
| 10,583,561 B2* | 3/2020 | Suvarna | B25J 9/1666 |
| 10,583,562 B2* | 3/2020 | Stout | G05D 1/0272 |
| 10,586,344 B2* | 3/2020 | Qi | G06T 7/579 |
| 2017/0364087 A1* | 12/2017 | Tang | G05D 1/0088 |

* cited by examiner

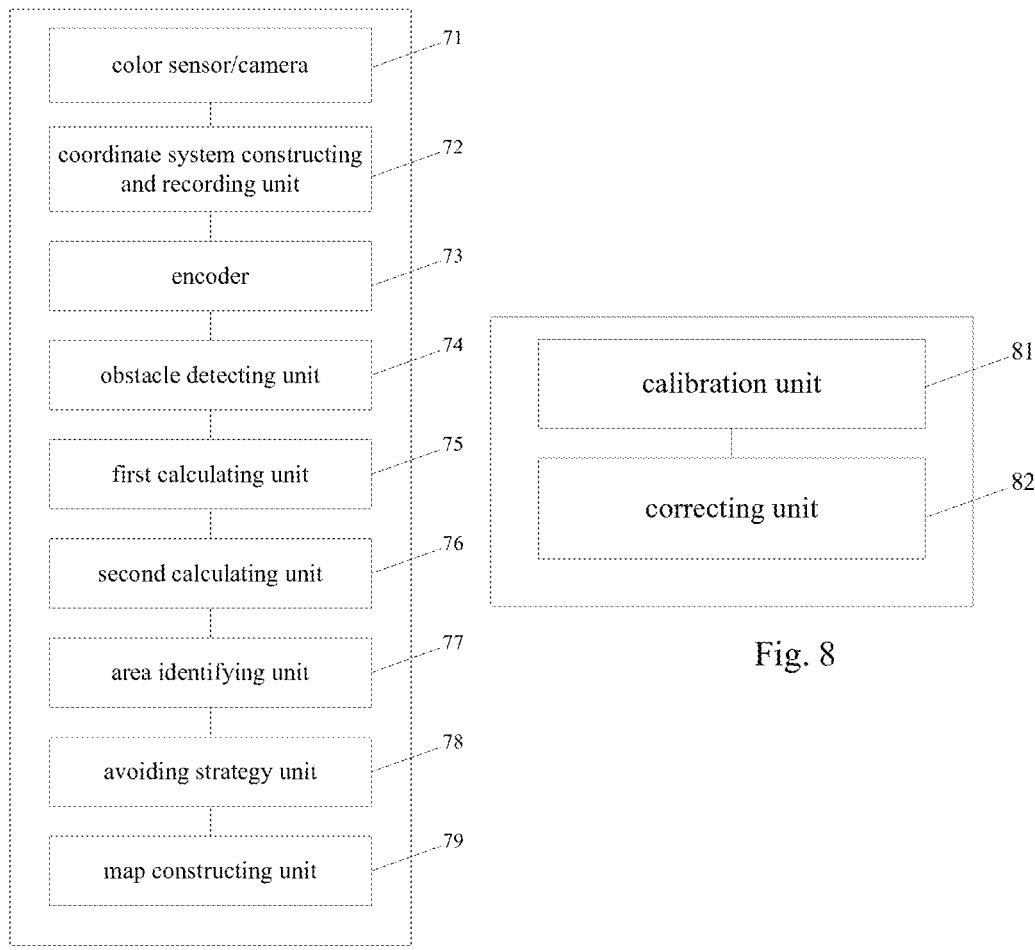

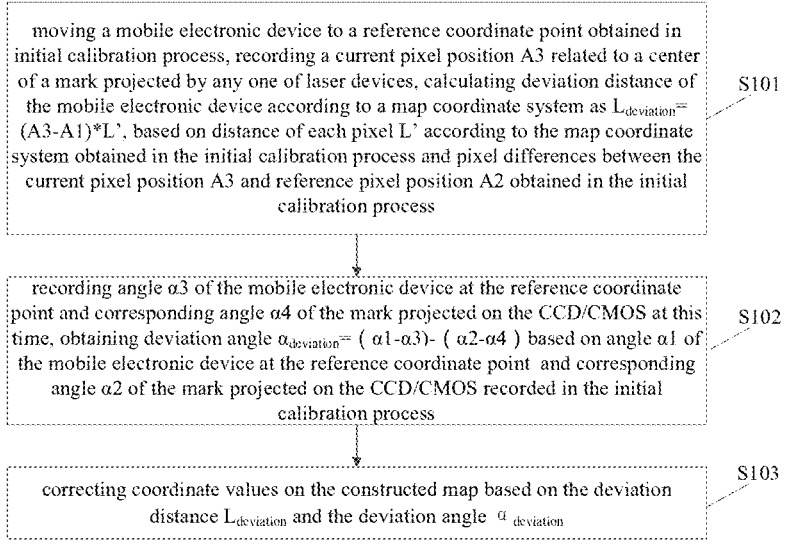
Fig.10
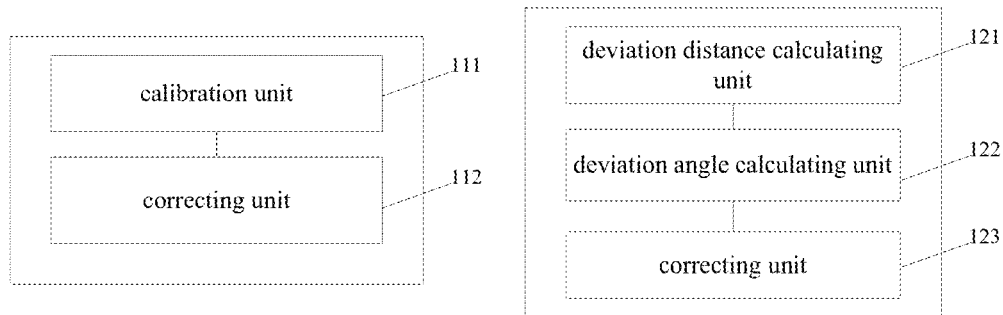
Fig.11
Fig.12
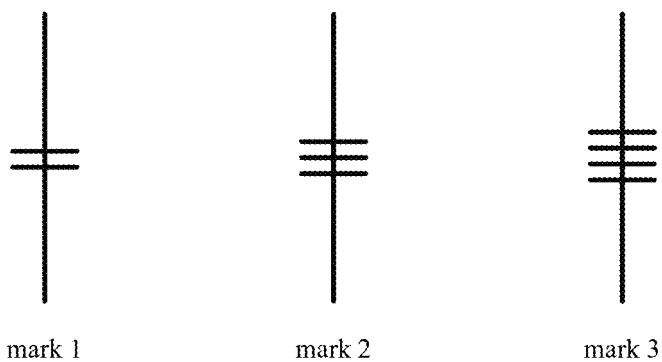
Fig.13

METHOD AND APPARATUS FOR MAP CONSTRUCTING AND MAP CORRECTING

CROSS-REFERENCE TO RELATED APPLICATIONS

The present application is a Continuation application of PCT application No. PCT/CN2016/075955 filed on Mar. 9, 2016, the contents of which are hereby incorporated by reference.

FIELD OF THE INVENTION

The present invention relates to the simultaneous localization and mapping field, more particularly to a method and an apparatus for map constructing and map correcting.

BACKGROUND OF THE INVENTION

The localization and mapping of mobile electronic devices is a hot spot in the field of robot. There has been a practical solution to the self-localization of mobile electronic devices in known environments and mapping with known locations of robots. However, in many environments the mobile electronic device can't be localized by using global location system, moreover it is difficult or even impossible to obtain the map of the mobile electronic device's working environment in advance. Hence the mobile electronic device needs to build the map in a completely unknown environment under the condition that its position is uncertain, and use the map to locate and navigate autonomously. This is so-called simultaneous localization and mapping (SLAM).

According to the simultaneous localization and mapping (SLAM), the mobile electronic device identifies characteristic indications in an unknown environment by utilizing sensors in the mobile electronic device, and the global coordinates of the mobile electronic device and the characteristic indications are estimated according to the relative position between the mobile electronic device and the characteristic indication and the reading of the encoder.

So far, the most common exiting positioning techniques of automatic walking robots or devices are:

GPS positioning; the basic principle of GPS positioning is based on instantaneous position of the satellite moving with high speed as a known starting data, and using the method of spatial distance resection to determine the location of the point to be measured.

bar code positioning mode. To convert the bar code compiled according to certain rules into meaningful information, it is necessary to go through two processes of scanning and decoding. The color of the object is determined by the type of light it reflects, the white object can reflect the visible light of various wavelengths, the black object absorbs the visible light of various wavelengths, so when the light emitted by the bar code scanner light is reflected on the bar code, the reflected light is irradiated to the photoelectric converter within the bar code scanner, and the photoelectric converter converts reflected light signal into the corresponding electrical signal on the basis of different strength of the reflected light signal. According to difference principles, the scanner can be divided into three types: light pen, CCD and laser. After being output to the amplifying circuit enhancement signals of the bar-code scanner, the electric signals are transmitted to the shaping circuit to convert the analog signals into digital signals. The width of the black bars are different, hence the duration of the corresponding electrical signals is different. Then the decoder determines the number of bars and nulls by measuring the number of pulse digital electrical signals of 0 and 1. The width of the bar and the empty is determined by measuring the duration of the 0, 1 signal. But the obtained data is still chaotic, in order to know the information contained in the bar code, it is necessary to convert the bar symbol into the corresponding number information and character information based on the corresponding coding rules (such as: EAN-8 yards). Finally, the details of the items will be identified through data processing and management by computer system.

The positioning technique above applied in automatic walking robot or automatic walking equipment is relatively complex, each with different shortcomings:

1. GPS positioning is not practical due to signal problems in the room.

The bar code positioning mode is limited in usage occasions due to the fact that the bar codes are easily polluted and can't be read.

Positioning and navigation technique of the mobile robot in the indoor environment has the characteristics of high precision and complicated environment for positioning, so the methods above are not applicable.

SUMMARY OF THE INVENTION

The present invention aims to provide method and apparatus for map constructing and map correcting, which effectively constructs a map with high accuracy.

The present invention provides a method for map constructing, wherein is applicable for real-time mapping of a to-be-localized area provided with at least one laser device, the method comprises steps:

taking a position of a mobile electronic which is moving along a certain trajectory as a coordinate origin of a map coordinate system, when a center of a mark projected by a first laser device and collected by a camera of a mobile electronic device coincides with central point of CCD/CMOS, and recording information of the mark of the first laser device and corresponding coordinate values;

moving the mobile electronic device with the coordinate origin as a starting point to traverse the entire to-be-localized area, calculating and recording coordinate values of a position of one of obstacles each time when it is detected by the mobile electronic device based on a moving direction and a moving distance of the mobile electronic device relative to the starting point during the traversing process; and constructing a map based on recorded information of mark and corresponding coordinate values and the coordinate values of the position of each said obstacle after the traversing process is finished.

According to another embodiment of the present invention, the number of laser devices is two or more, and each said laser devices is disposed at a specific position of the to-be-localized area, and the information of the mark projected by each said laser device includes unique encoding information for distinguishing its absolute position; the unique code information is represented by a specific graphic; the method further comprises step of:

calculating coordinate values of other laser device except the first laser device based on a moving direction and a moving distance of the mobile electronic device relative to the starting point during the traversing process, when a center of a mark projected by the other laser device and collected by the camera of the mobile electronic device coincides with the central point of the CCD/CMOS, recording information of the mark of the other laser device and corresponding coordinate values.

According to another embodiment of the present invention, the information of the mark further includes area coding information for distinguishing accessible area/unaccessible area, and specific area behind a boundary where the laser device projecting the area coding information of the unaccessible area is located is limited as unaccessible area, the area coding information represents the accessible area by the same shape and represents the unaccessible area by another shape; the method further comprises step of:

identifying whether the area coding information of the mark represents accessible area or unaccessible area once the mobile electronic device obtains information of any mark emitted by one of laser devices, and moving the mobile electronic device to avoid the unaccessible area according to a preset avoidance strategy if the unaccessible area is identified.

According to another embodiment of the present invention, the method further comprises step of:

making marks of the accessible area/unaccessible area on the constructed map according to the area coding information of the mark during map-constructing process based on the recorded information of the mark and the corresponding coordinate values and the coordinate values of the position of each said obstacle after the traversing process is finished.

According to another embodiment of the present invention, the coordinate values of the position of any one of obstacles are calculated when the mobile electronic device detects the obstacle each time in the following manners:

sensing the obstacle by using a collision sensor, and taking coordinate values of the mobile electronic device as the coordinate values of the position of the obstacle when the collision sensor senses a collision with the obstacle; or detecting the obstacle by using a laser sensor/an infrared sensor, and calculating position of the obstacle relative to a current position of the mobile electronic device according to a laser/infrared distance calculating principle when the laser sensor/infrared sensor detects the obstacle, thus calculating the coordinate values of the position of the obstacle.

According to another embodiment of the present invention, the method further comprises step of:

calibration process: recording a first pixel position A1 on the CCD/CMOS related to the center of the mark projected by any one of laser devices, when the mobile electronic device is moved to a first position R1 of the map; recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as (A2−A1)/L, wherein (A2−A1) represents number of pixels between A2 and A1; recording coordinate values of the second position R2 of the mobile electronic device according to the map coordinate system and corresponding coordinate values of the center of the mark on the CCD/CMOS, and recording angle α1 of the mobile electronic device in the second position R2 and corresponding angle α2 of the mark projected on the CCD/CMOS;

correcting process: moving the mobile electronic device to the second position R2 when the map needs to be corrected at any time after the map is constructed, recording a third pixel position A3 on the CCD/CMOS related to the center of the mark projected by the laser device, so as to obtain deviation distance of the mobile electronic device according to the map coordinate system as $L_{deviation}=(A3-A1)*(A2-A1)/L$; recording angle α3 of the mobile electronic device in the second position R2 and corresponding angle α4 of the mark projected on the CCD/CMOS at this time, so as to obtain deviation angle $\alpha_{deviation}=(\alpha 1-\alpha 3)-(\alpha 2-\alpha 4)$; correcting coordinate values of the constructed map based on the deviation distance $L_{deviation}$ and the deviation angle $\alpha_{deviation}$.

According to another embodiment of the present invention, the mark includes a position correction mark point and an angle correction mark, and the position correction mark point is located at the center of the entire mark, the angle α1 and the angle α2 are calculated by the following equations:

$$\alpha 2=\arctan(y1/x1);$$

$$\alpha 4=\arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

According to another embodiment of the present invention, the position correction mark point is short line and the angle correction mark is long line.

According to another embodiment of the present invention, the mobile electronic device is a robot.

According to another embodiment of the present invention, the method is applicable for real-time map constructing of indoor to-be-localized area.

According to another embodiment of the present invention, the laser device is suitable to be mounted on wall, ceiling or doorframe.

The present invention further discloses a method for map correcting, wherein the method comprises:

calibration step: recording a first pixel position A1 on CCD/CMOS related to a center of a mark projected by any one of laser devices, when a mobile electronic device is moved to a first position R1 of a map; recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as (A2−A1)/L, wherein (A2−A1) represents number of pixels between A2 and A1; recording coordinate values of the second position R2 of the mobile electronic device according to the map coordinate system and corresponding coordinate values of the center of the mark on the CCD/CMOS, and recording angle α1 of the mobile electronic device in the second position R2 and corresponding angle α2 of the mark projected on the CCD/CMOS; and correcting step: moving the mobile electronic device to the second position R2 when the map needs to be corrected at any time after the map is constructed, recording a third pixel position A3 on the CCD/CMOS related to the center of the mark projected by the laser device, so as to obtain deviation distance of the mobile electronic device according to the map coordinate system as $L_{deviation}=(A3-A1)*(A2-A1)/L$; recording angle α3 of the mobile electronic device in the second position R2 and corresponding angle α4 of the mark projected on the CCD/CMOS at this time, so as to obtain deviation angle $\alpha_{deviation}(\alpha 1-\alpha 3)-(\alpha 2-\alpha 4)$; correcting coordinate values of the constructed map based on the deviation distance $L_{deviation}$ and the deviation angle $\alpha_{deviation}$.

According to another embodiment of the present invention, the mark includes a position correction mark point and an angle correction mark, and the position correction mark point is located at the center of the entire mark, the angle $\alpha 1$ and the angle $\alpha 2$ are calculated by the following equations:

$$\alpha 2=\arctan(y1/x1);$$

$$\alpha 4=\arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

According to another embodiment of the present invention, the position correction mark point is short line and the angle correction mark is long line.

According to another embodiment of the present invention, the mobile electronic device is a robot.

According to another embodiment of the present invention, the map is constructed with any one of above methods for map constructing.

The present invention further discloses a method for map correcting, wherein the method comprises:

moving a mobile electronic device to a reference coordinate point obtained in initial calibration process, recording a current pixel position A3 related to a center of a mark projected by any one of laser devices, calculating deviation distance of the mobile electronic device according to a map coordinate system as $L_{deviation}=(A3-A1)*L'$, based on distance of each pixel $L'$ according to the map coordinate system obtained in the initial calibration process and pixel differences between the current pixel position A3 and reference pixel position A2 obtained in the initial calibration process;

recording angle $\alpha 3$ of the mobile electronic device at the reference coordinate point and corresponding angle $\alpha 4$ of the mark projected on the CCD/CMOS at this time, obtaining deviation angle $\alpha_{deviation}=(\alpha 1-\alpha 3)-(\alpha 2-\alpha 4)$ based on angle $\alpha 1$ of the mobile electronic device at the reference coordinate point and corresponding angle $\alpha 2$ of the mark projected on the CCD/CMOS recorded in the initial calibration process; and correcting coordinate values on the constructed map based on the deviation distance $L_{deviation}$ and the deviation angle $\alpha_{deviation}$.

According to another embodiment of the present invention, the initial calibration process is as follows:

recording a first pixel position A1 on the CCD/CMOS related to the center of the mark projected by any one of the laser devices, when the mobile electronic device is moved to a first position R1 of a map;

recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as $L'=(A2-A1)/L$, wherein (A2−A1) represents number of pixels between A2 and A1;

recording coordinate values of the second position R2 of the mobile electronic device according to the map coordinate system and corresponding coordinate values of the center of the mark on the CCD/CMOS; the second position R2 is the reference coordinate point; and recording angle $\alpha 1$ of the mobile electronic device in the second position R2 and angle $\alpha 2$ of the mark projected on the CCD/CMOS.

According to another embodiment of the present invention, the mark includes a position correction mark point and an angle correction mark, and the position correction mark point is located at the center of the entire mark, the angle $\alpha 1$ and the angle $\alpha 2$ are calculated by the following equations:

$$\alpha 2=\arctan(y1/x1);$$

$$\alpha 4=\arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

According to another embodiment of the present invention, the position correction mark point is short line and the angle correction mark is long line.

According to another embodiment of the present invention, the mobile electronic device is a robot.

According to another embodiment of the present invention, the map is constructed with any one of above methods for map constructing.

The present invention provides an apparatus for map constructing, wherein the apparatus comprises:

a camera, configured to collect mark projected by laser device;

a coordinate system constructing and recording unit, configured to take a position of a mobile electronic which is moving along a certain trajectory as a coordinate origin of a map coordinate system, when a center of a mark projected by a first laser device and collected by the camera of a mobile electronic device coincides with central point of CCD/CMOS, and recording information of the mark of the first laser device and corresponding coordinate values;

an encoder, configured to record a moving distance and a moving direction of the mobile electronic device relative to a starting point in real time through gyroscope when the mobile electronic device traverses the entire to-be-localized area with the coordinate origin as the starting point;

an obstacle detecting unit, configured to detect obstacles;

a first calculating unit, configured to calculate coordinate values of the location of each said obstacle based on the moving direction and the moving distance of the mobile electronic device relative to the starting point recorded by the encoder when the mobile electronic device detects any one of the obstacle, and send the calculated coordinate values to the coordinate system constructing and recording unit; and a map constructing unit, configured to construct a map according to information of mark and corresponding coordinate values and the coordinate values of the location of each said obstacle recorded by the coordinate system constructing and recording unit.

According to another embodiment of the present invention, the information of the mark further includes area coding information for distinguishing accessible area/unaccessible area, and area behind boundary where the laser device projecting the area coding information of the unaccessible area is located is limited as unaccessible area, the area coding information represents the accessible area by the same shape and represents the unaccessible area by another shape; the apparatus further comprises:

an area identifying unit, configured to identify whether the area coding information in the information of the mark represents accessible area or unaccessible area once the mobile electronic device obtains information of any mark, and move the mobile electronic device to avoid the unaccessible area according a preset avoidance strategy if the unaccessible area is identified.

According to another embodiment of the present invention, the map constructing unit makes marks of the accessible area/unaccessible area on the constructed map according to the area coding information of the information of the mark during map-constructing process based on recorded information of the recorded information of the mark and the corresponding coordinate values and the coordinate values of the position of each said obstacle after the traversing process is finished.

According to another embodiment of the present invention, the obstacle detecting unit comprises a collision sensor, laser sensor or an infrared sensor;

when the obstacles are sensed by a collision sensor, and the first calculating unit takes coordinate values of the mobile electronic device as the coordinate values of the position of any one of the obstacles when the collision sensor senses a collision with the obstacle; or when the obstacles are detected by a laser sensor/an infrared sensor, position of any one of the obstacles relative to a current position of the mobile electronic device is calculated according to a laser/infrared distance calculating principle when the laser sensor/infrared sensor detects the obstacle, which is then sent to the first calculating unit; thus the first calculating unit calculates the coordinate values of the position of the obstacle based on coordinate values of current position of the mobile electronic device and coordinate values of the position of the obstacle relative to the current location of the mobile electronic device.

According to another embodiment of the present invention, the apparatus further comprises:

a calibration unit: configured to record a first pixel position A1 on the CCD/CMOS related to the center of the mark projected by any one of laser devices, when the mobile electronic device is moved to a first position R1 of the map; recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as (A2−A1)/L, wherein (A2−A1) represents number of pixels between A2 and A1; recording coordinate values of the second position R2 of the mobile electronic device according to the map coordinate system and corresponding coordinate values of the center of the mark on the CCD/CMOS, and recording angle α1 of the mobile electronic device in the second position R2 and corresponding angle α2 of the mark projected on the CCD/CMOS; and a correcting unit: configured to move the mobile electronic device to the second position R2 when the map needs to be corrected at any time after the map is constructed, recording a third pixel position A3 on the CCD/CMOS related to the center of the mark projected by the laser device, so as to obtain deviation distance of the mobile electronic device according to the map coordinate system as $L_{deviation}=(A3-A1)*(A2-A1)/L$; recording angle α3 of the mobile electronic device in the second position R2 and corresponding angle α4 of the mark projected on the CCD/CMOS at this time, so as to obtain deviation angle $α_{deviation}$ (α1−α3)−(α2−α4); correcting coordinate values of the constructed map based on the deviation distance $L_{deviation}$ and the deviation angle $α_{deviation}$.

According to another embodiment of the present invention, the mark includes a position correction mark point and an angle correction mark, and the position correction mark point is located at the center of the entire mark, the angle α1 and the angle α2 are calculated by the following equations:

$$α1=\arctan(y1/x1);$$

$$α2=\arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

According to another embodiment of the present invention, the position correction mark point is short line and the angle correction mark is long line.

According to another embodiment of the present invention, the mobile electronic device is a robot.

According to another embodiment of the present invention, the method is applicable for real-time map constructing of indoor to-be-localized area.

According to another embodiment of the present invention, the laser device is suitable to be mounted on wall, ceiling or doorframe.

The present invention provides an apparatus for map correcting, wherein the apparatus comprises:

a calibration unit, configure to record a first pixel position A1 on CCD/CMOS related to a center of a mark projected by any one of laser devices, when a mobile electronic device is moved to a first position R1 of a map; recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as (A2−A1)/L, wherein (A2−A1) represents number of pixels between A2 and A1; recording coordinate values of the second position R2 of the mobile electronic device according to the map coordinate system and corresponding coordinate values of the center of the mark on the CCD/CMOS, and recording angle α1 of the mobile electronic device in the second position R2 and corresponding angle α2 of the mark projected on the CCD/CMOS; and a correcting unit, configure to move the mobile electronic device to the second position R2 when the map needs to be corrected at any time after the map is constructed, recording a third pixel position A3 on the CCD/CMOS related to the center of the mark projected by the laser device, so as to obtain deviation distance of the mobile electronic device according to the map coordinate system as $L_{deviation}=(A3-A1)*(A2-A1)/L$; recording angle α3 of the mobile electronic device in the second position R2 and corresponding angle α4 of the mark projected on the CCD/CMOS at this time, so as to obtain deviation angle $α_{deviation}$(α1−α3)−(α2−

α4); correcting coordinate values of the constructed map based on the deviation distance $L_{deviation}$ and the deviation angle $\alpha_{deviation}$.

According to another embodiment of the present invention, the mark includes a position correction mark point and an angle correction mark, and the position correction mark point is located at the center of the entire mark, the angle α1 and the angle α2 are calculated by the following equations:

$$\alpha 1 = \arctan(y1/x1);$$

$$\alpha 2 = \arctan(y2/x2);$$

wherein x1 and y1 are respectively pixel differences of the angle correction mark on X-axis and Y-axis of the CCD/CMOS collected by the mobile electronic device arriving at the second position R2 during the calibration process; and x2 and y2 are respectively pixel differences of the angle correction mark collected on the X-axis and the Y-axis of the CCD/CMOS by the mobile electronic device arriving at the second position R2 during the correcting process.

According to another embodiment of the present invention, the position correction mark point is short line and the angle correction mark is long line.

According to another embodiment of the present invention, the mobile electronic device is a robot.

According to another embodiment of the present invention, the map is constructed by any one of above apparatuses for map constructing according to claims 21~30.

The present invention provides an apparatus for map correcting, wherein the apparatus comprises:

a deviation distance calculating unit, configured to move a mobile electronic device to a reference coordinate point obtained in initial calibration process, recording a current pixel position A3 related to a center of a mark projected by any one of laser devices, calculating deviation distance of the mobile electronic device according to a map coordinate system as $L_{deviation} = (A3-A1)*L'$, based on distance of each pixel L' according to the map coordinate system obtained in the initial calibration process and pixel differences between the current pixel position A3 and reference pixel position A2 obtained in the initial calibration process;

a deviation angle calculating unit, configured to record angle α3 of the mobile electronic device at the reference coordinate point and corresponding angle α4 of the mark projected on the CCD/CMOS at this time, obtaining deviation angle $\alpha_{deviation} = (\alpha 1-\alpha 3)-(\alpha 2-\alpha 4)$ based on angle α1 of the mobile electronic device at the reference coordinate point and corresponding angle α2 of the mark projected on the CCD/CMOS recorded in the initial calibration process;

a correcting unit, configured to correct coordinate values on the constructed map based on the deviation distance $L_{deviation}$ and the deviation angle $\alpha_{deviation}$.

According to another embodiment of the present invention, the initial calibration process is as follows:

recording a first pixel position A1 on the CCD/CMOS related to the center of the mark projected by any one of the laser devices, when the mobile electronic device is moved to a first position R1 of a map;

recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as $L' = (A2-A1)/L$, wherein (A2-A1) represents number of pixels between A2 and A1;

recording coordinate values of the second position R2 of the mobile electronic device according to the map coordinate system and corresponding coordinate values of the center of the mark on the CCD/CMOS; the second position R2 is the reference coordinate point; and recording angle α1 of the mobile electronic device in the second position R2 and angle α2 of the mark projected on the CCD/CMOS.

According to another embodiment of the present invention, the mark includes a position correction mark point and an angle correction mark, and the position correction mark point is located at the center of the entire mark, the angle α1 and the angle α2 are calculated by the following equations:

$$\alpha 1 = \arctan(y1/x1);$$

$$\alpha 2 = \arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

According to another embodiment of the present invention, the position correction mark point is short line and the angle correction mark is long line.

According to another embodiment of the present invention, the map is constructed by any one of apparatuses for above map constructing.

Compared with the prior art, the method and apparatus for map constructing and map correcting disclosed by the present invention is achieved by arranging at least one laser device in a to-be-localized area, taking a position of a mobile electronic as a coordinate origin of a map coordinate system when a center of a mark projected by a first light-emitting device and detected by a camera of a mobile electronic device coincides with central point of CCD/CMOS, and recording information of the mark of the first light-emitting device and corresponding coordinate values; and moving the mobile electronic device with the coordinate origin as a starting point to traverse the entire to-be-localized area, calculating and recording coordinate values of a position of one of obstacles each time when it is detected by the mobile electronic device based on a moving direction and a moving distance of the mobile electronic device relative to the starting point during the traversing process; and constructing a map based on recorded information of mark and corresponding coordinate values and the coordinate values of the position of each said obstacle after the traversing process is finished. As a result, only a laser device or more is needed to realize localization and mapping for the to-be-localized area according the present invention, and the method is simple, of high accuracy and has the advantages of low cost, being simple to operate and high efficiency. In addition, after the map constructing is completed, the camera can be used to correct the constructed map by recognizing the light emitting device, so as to prevent map errors caused by gyroscope drifting or wheel slipping of the mobile electronic device.

BRIEF DESCRIPTION OF THE DRAWINGS

FIG. 7 is composition block diagram of an apparatus for map constructing based on light-emitting device according to embodiment 7 of the present invention.

FIG. 8 is composition block diagram of an apparatus for map constructing based on light-emitting device according to embodiment 8 of the present invention.

FIG. 9 is a flowchart of a method for map correcting based on light-emitting device according to embodiment 9 of the present invention.

FIG. 10 is a flowchart of a method for map correcting based on light-emitting device according to embodiment 10 of the present invention.

FIG. 11 is composition block diagram of an apparatus for map correcting based on light-emitting device according to embodiment 11 of the present invention.

FIG. 12 is composition block diagram of an apparatus for map correcting based on light-emitting device according to embodiment 12 of the present invention.

FIG. 13 shows three different marks as the unique encoding information for distinguishing its absolute position.

DETAILED DESCRIPTION OF ILLUSTRATED EMBODIMENTS

The technical solutions of the embodiments according to the present invention are clearly and fully described as below with reference to the accompanying drawings in the embodiments of the present invention. Apparently, the embodiments to be described are merely a part rather than all of the embodiments of the present invention. All other embodiments obtained by persons with ordinary skills in the art based on the embodiments of the present invention without creative efforts shall fall within the protection scope of the present invention.

Figure 1:
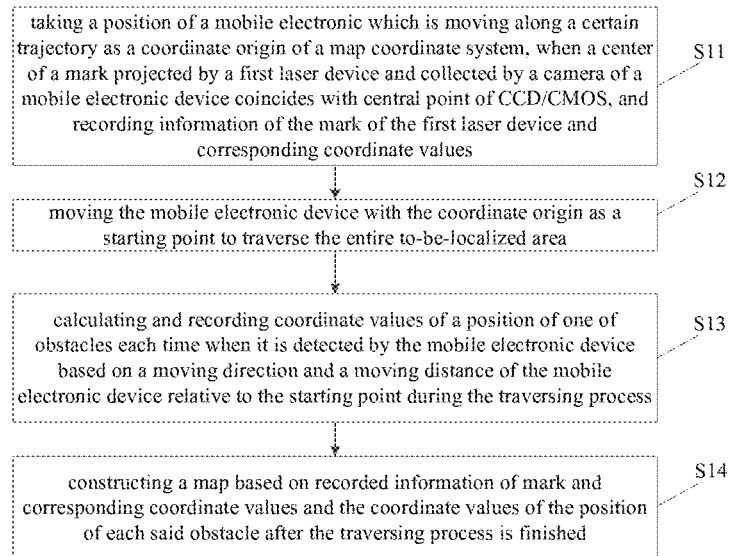
FIG. 1 is a flowchart of a method for map constructing based on light-emitting device according to embodiment 1 of the present invention.

Referring to FIG. 1, it is a flowchart of a method for map constructing according to embodiment 1 of the present invention. The method for map constructing is applicable for real-time mapping of a to-be-localized area provided with at least one laser device through a mobile electronic device. The mobile electronic device can be, for example, a robot.

The method for map constructing comprises steps of:

step 11, taking a position of a mobile electronic which is moving along a certain trajectory as a coordinate origin of a map coordinate system, when a center of a mark projected by a first laser device and collected by a camera of a mobile electronic device coincides with central point of CCD/CMOS, and recording information of the mark of the first laser device and corresponding coordinate values;

step 12, moving the mobile electronic device with the coordinate origin as a starting point to traverse the entire to-be-localized area;

step 13, calculating and recording coordinate values of a position of one of obstacles each time when it is detected by the mobile electronic device based on a moving direction and a moving distance of the mobile electronic device relative to the starting point during the traversing process; and step 14, constructing a map based on recorded information of mark and corresponding coordinate values and the coordinate values of the position of each said obstacle after the traversing process is finished.

In step 11, after arranging one laser device in at least one specific position/any position of the to-be-localized, it is necessary to have the mobile electronic traversing the entire area to obtain relevant information in the area, thus realizing localization and mapping for the entire area. At the beginning of the first traversal, when a center of a mark projected by a first laser device and collected by a camera of a mobile electronic device coincides with central point of CCD/CMOS, a position of the first laser device (that is, a current position of the mobile electronic device) is taken as the coordinate origin of a map coordinate system composed of X-axis and Y-axis, and information of the mark of the first laser device and corresponding coordinate values are recorded. As can be understood, corresponding coordinate values herein is referred to coordinate values of the position of the first laser device, that is, the coordinate values of the current position of the mobile electronic device.

As can be understood, in order to facilitate calculation and composition, a position of the mobile electronic device is taken as the coordinate origin of a map coordinate system composed of X-axis and Y-axis when the center of the mark projected by the first laser device and detected by the camera of the mobile electronic device coincides with the central point of the CCD/CMOS. However, the position of the mobile electronic device is not limited as the coordinate origin of the coordinate system composed of the X-axis and the Y-axis, and may be marked as other reference points, so as to have a reference function to facilitate recording information of other points.

According to the present embodiment, at least one laser device is correspondingly arranged at a specific position of the to-be-localized area, and the information of the mark projected by the laser device comprises unique coding information used for distinguishing an absolute position thereof, the unique coding information is represented by different types of specific graphic. Referring to FIG. 13, information of different marks comprises unique coding information (markers) for distinguishing its absolute position, and information is distinguished by different patterns, for example, mark 2 is represented by three short straight lines, mark 3 is represented by four short straight lines . . . .

As can be understood, description of the mark rendered above is in a simple way, which is limited thereto. Composition of the mark can be in more various ways. Specifically, it is more convenient to select a way for composition of the mark by considering the number of marks needed in the environment of to-be-localized area. In this embodiment, the mobile electronic device reads the information of the mark through a camera.

In steps 12~13, the mobile electronic device is moved to traverse the entire to-be-localized area with the coordinate origin as a starting point when it is determined that the position where the mobile electronic device detects the mark of the first laser device is taken as the coordinate origin. Furthermore, when the mobile electronic device starts to move from the starting point, calculation of a moving direction and a moving distance of the mobile electronic device relative to the starting point is started up in real time (for example, the moving path and relative position and angle of the robot can be recorded in real time through encoder installed on driving wheel axle of the robot, so that the position (including the distance and the direction) of the mobile electronic device relative to the starting point can be obtained through calculation). When the mobile electronic device detects an obstacle each time during the traversing process, the coordinate values of the position of the obstacle can be calculated in the following approaches:

Approach 1: The obstacle is sensed by using a collision sensor, and current coordinate values of the mobile electronic device are taken as the coordinate values of the position of the obstacle when the collision sensor senses a collision with the obstacle.

Approach 2: the obstacle is detected by using a laser sensor/a infrared sensor, and the position of the obstacle relative to the current location of the mobile electronic device is calculated on the basis of a laser/infrared distance calculating principle when the laser sensor/infrared sensor detects the obstacle, thus the coordinate values of the position of the obstacle are calculated.

Moreover, an additional collision strategy is set in the present embodiment. That is, when the mobile electronic device has collided with an obstacle during the traversing process, the mobile electronic device is moved to avoid the obstacle according to a preset collision strategy.

According to a preferable embodiment of the present invention, the preset collision strategy comprises: when the mobile electronic device senses a collision with the obstacle through (for example, a collision sensor), the mobile electronic device will perform an intelligent analysis to determine the ways of further movement. For example, the mobile electronic device may choose to retreat by greater than 0 cm and less than 20 cm and rotate to the right or left by 1-10 degrees according to a specific environmental pattern of the to-be-localized area. When the mobile electronic device is in a confined space, the mobile electronic device may choose to retreat by greater than 0 and less than 2 cm. Furthermore, the mobile electronic device chooses a larger angle of rotation, for example, the rotation angle of 2 degrees or even 10 degrees, when collision points of consecutive rotations for 3 times by 1 degree are in a plane.

As can be understood, in addition to the preset collision strategy disclosed herein, the collision strategy according to the present embodiment can also adopt other approaches, which is not limited thereto.

Therefore, according the preset collision strategy, the mobile electronic device continue to move to detect the coordinate values of other mark and other obstacle, and the traversal for one time is accomplished until the entire to-be-localized area has been traversed. As can be understood, all the feature information (including the position of the mark and the position of each said obstacle) of the to-be-localized area is recorded after the mobile electronic device has accomplished the traversal for one time.

In step 14, a map is constructed on the basis of the recorded information of the mark and the corresponding coordinate values and the coordinate values of the position of each said obstacle after the mobile electronic device has accomplished the traversal for one time. The more recorded information, the richer and more detailed the constructed map will be. For example, when the mobile electronic device collides with an obstacle, the coordinate values of the obstacle are recorded, so that when the mobile electronic device which is arranged in the indoor environment has traversed the entire room, the coordinate values of all the obstacles can be recorded continuously, and the obstacles surrounds as periphery and at the same time makes a circle which can be considered as a wall, so that a barrier-free region area, an obstacle area and a wall area of the room can be separated and consequently the map of the whole room is constructed.

As can be understood, the constructed map is 2D map, and the mobile electronic device (for example, a robot) may navigate according to the constructed map.

It can be seen that only a laser device or more (e.g. LED source, laser source or infrared source) is needed to realize localization and mapping for the to-be-localized area according to the present invention, and the method is simple, of high accuracy and has the advantages of low cost, being simple to operate and high efficiency.

Figure 2:
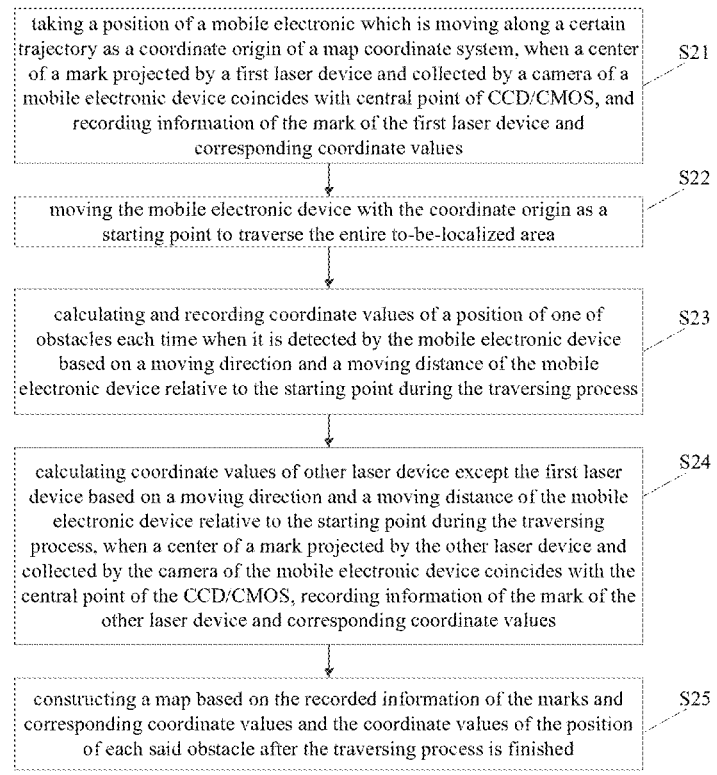
FIG. 2 is a flowchart of a method for map constructing based on light-emitting device according to embodiment 2 of the present invention.

Referring to FIG. 2, it is a flowchart of a method for map constructing according to embodiment 2 of the present invention. The method for map constructing is applicable for real-time mapping of a to-be-localized area provided with two or more laser devices through a mobile electronic device. Each said laser device is arranged at a specific position of the to-be-localized area, and the mark projected by each said laser device includes unique encoding information for distinguishing its absolute position. The unique encoding information is represented by different types of specific graphic. The mobile electronic device can be, for example, a robot.

The method for map constructing comprises steps of:

step 21, taking a position of a mobile electronic which is moving along a certain trajectory as a coordinate origin of a map coordinate system, when a center of a mark projected by a first laser device and collected by a camera of a mobile electronic device coincides with central point of CCD/CMOS, and recording information of the mark of the first laser device and corresponding coordinate values;

step 22, moving the mobile electronic device with the coordinate origin as a starting point to traverse the entire to-be-localized area;

step 23, calculating and recording coordinate values of a position of one of obstacles each time when it is detected by the mobile electronic device based on a moving direction and a moving distance of the mobile electronic device relative to the starting point during the traversing process;

step 24, calculating coordinate values of other laser device except the first laser device based on a moving direction and a moving distance of the mobile electronic device relative to the starting point during the traversing process, when a center of a mark projected by the other laser device and collected by the camera of the mobile electronic device coincides with the central point of the CCD/CMOS, recording information of the mark of the other laser device and corresponding coordinate values; and step 25, constructing a map based on the recorded information of the marks and corresponding coordinate values and the coordinate values of the position of each said obstacle after the traversing process is finished.

As can be understood, steps 21~23 and step 25 in the present embodiment are basically consistent with steps 11~13 and 14 as shown in FIG. 1, which will not be repeated thereto.

Different from the embodiment 1, since the method of the present embodiment is applicable to localize the to-be-localized area provided with two or more laser devices, and each said laser device is arranged at a specific position of the to-be-localized area, and the information of the mark projected by each laser device comprises unique coding information used for distinguishing its absolute position. Therefore, during the mobile electronic device's traversing process, in addition to calculating and recording the coordinate values of the position of one of the obstacles each time when an obstacle is detected by the mobile electronic device, coordinate values of other laser device except the first laser device are calculated by the mobile electronic device when the mobile electronic device obtains information of the mark of the other laser device, that is, step 24.

Similarly, a current position of the mobile electronic device is taken as a corresponding position of other laser device when a center of a spot mark projected by the other laser device and detected by a camera of a mobile electronic device coincides with central point of the CCD/CMOS, and the coordinate values of the position and information of corresponding mark are recorded.

As can be understood, the information of the mark of the laser device obtained by the mobile electronic device herein mainly contains unique encoding information for distinguishing absolute position thereof. For example, when at least two laser devices are placed at different specific positions (for example, room 1, room 2, . . . ) of the to-be-localized area, it is necessary to determine and distinguish the specific location (absolute location) where any one of the laser devices is located by identifying the unique encoding information of the laser device, for example, the laser device is located in room 1 or room 2, or the like. Therefore, the absolute position where the laser device is located can be identified and then determined by obtaining the unique encoding information of the laser device.

The representations of the unique encoding information of the mark can be referred to the related description of the first embodiment as described above.

As can be understood, the method for map constructing according to the present embodiment is applicable for real-time mapping for indoor to-be-localized area. When localizing the indoor environment, it is preferable to place laser device on left side wall or/and right side wall of door frame in each room, of which corresponding mark is projected onto the door frame of ceiling.

In this way, the mobile electronic device can realize navigating and identifying absolute position based on the unique encoding information of each said laser device after the map construction is accomplished based on the recorded information of the mark of each said laser device and the coordinate values thereof and the coordinate values of each said obstacle. For example, when the robot is required to traverse the room 2 for one time, the absolute position of the room 2 can be determined based on the unique encoding information of the mark projected by the laser device mounted on the left or/and right side wall of the door frame in the room 2 and the mobile electronic device is navigated to arrive in the room 2 based on the relative coordinate values (direction and distance relative to the coordinates origin) of the laser device on the constructed map.

In addition, the mobile electronic device (the robot) knows where it is located based on the unique encoding information in the mark of each said laser device. For example, a cleaning robot, which is required to clean a plurality of rooms, can determine which room it is located in by identifying the unique coding information of the corresponding laser device of each room, so as to avoid multiple cleanings for the same room and reduce repeated work. The main purpose of distinguishing the rooms is cleaning one room after one room, so the efficiency will be higher. In this way, the robot traversal will cover a lot less repetitive routes.

Figure 3:
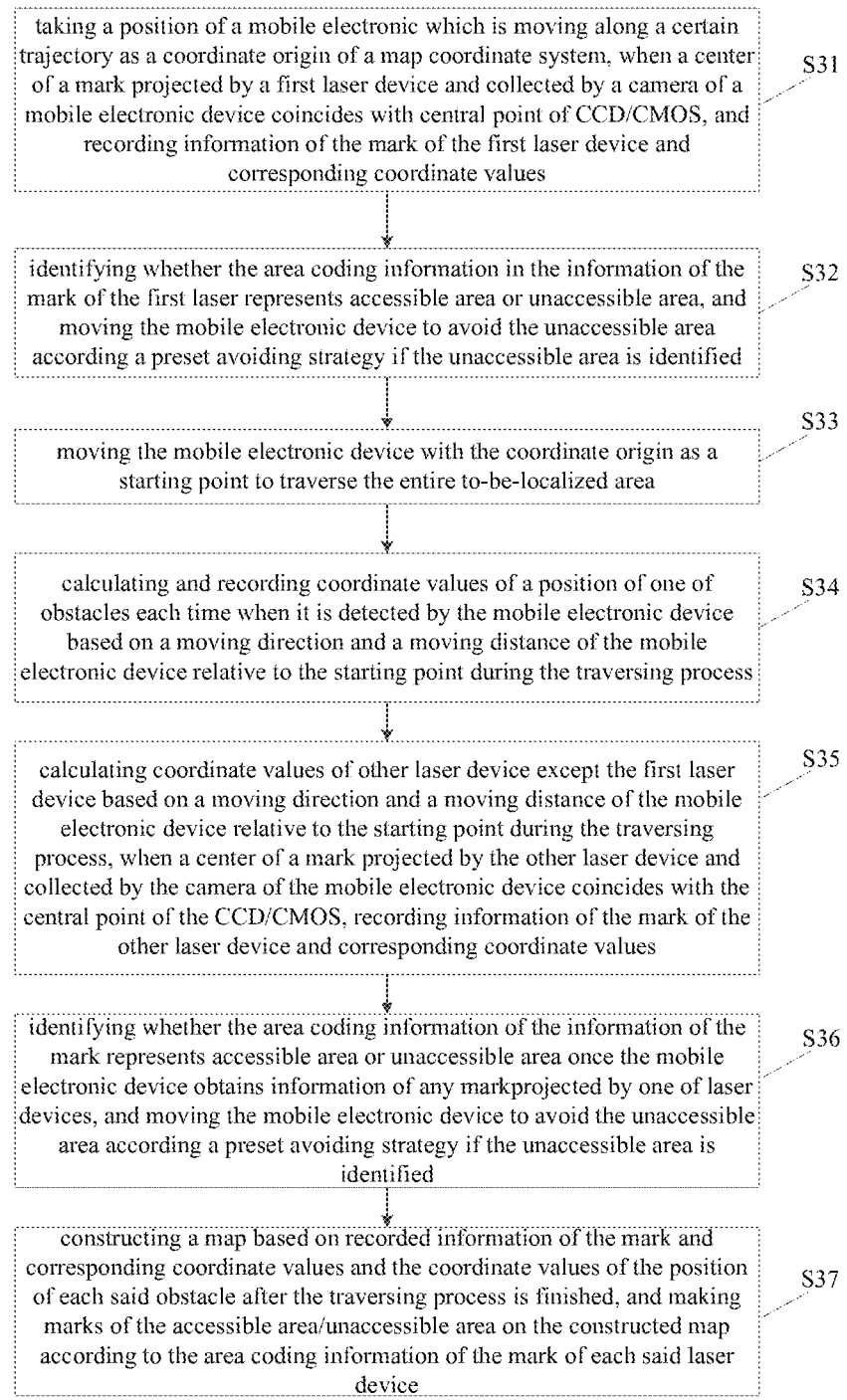
FIG. 3 is a flowchart of a method for map constructing based on light-emitting device according to embodiment 3 of the present invention.

Referring to FIG. 3, it is a flowchart of a method for map constructing according to embodiment 3 of the present invention. The method for map constructing is applicable for real-time mapping of a to-be-localized area provided with two or more laser devices by a mobile electronic device. Each said laser device is arranged at a specific position of the to-be-localized area, and information of the mark projected by each said laser device includes unique encoding information for distinguishing its absolute position and area coding information for distinguishing accessible area/unaccessible area. Specific area behind a boundary where the laser device projecting the area coding information of the unaccessible area is located is limited as unaccessible area. The unique encoding information is represented by different types of specific graphic. The area coding information represents the accessible area by the same shape and represents the unaccessible area by another shape. The mobile electronic device can be, for example, a robot.

step 31, taking a position of a mobile electronic which is moving along a certain trajectory as a coordinate origin of a map coordinate system, when a center of a mark projected by a first laser device and collected by a camera of a mobile electronic device coincides with central point of CCD/CMOS, and recording information of the mark of the first laser device and corresponding coordinate values;

step 32, identifying whether the area coding information in the information of the mark of the first laser represents accessible area or unaccessible area, and moving the mobile electronic device to avoid the unaccessible area according a preset avoiding strategy if the unaccessible area is identified;

step 33, moving the mobile electronic device with the coordinate origin as a starting point to traverse the entire to-be-localized area;

step 34, calculating and recording coordinate values of a position of one of obstacles each time when it is detected by the mobile electronic device based on a moving direction and a moving distance of the mobile electronic device relative to the starting point during the traversing process;

step 35, calculating coordinate values of other laser device except the first laser device based on a moving direction and a moving distance of the mobile electronic device relative to the starting point during the traversing process, when a center of a mark projected by the other laser device and collected by the camera of the mobile electronic device coincides with the central point of the CCD/CMOS, recording information of the mark of the other laser device and corresponding coordinate values;

step 36, identifying whether the area coding information of the information of the mark represents accessible area or unaccessible area once the mobile electronic device obtains information of any mark projected by one of laser devices, and moving the mobile electronic device to avoid the unaccessible area according a preset avoiding strategy if the unaccessible area is identified; and step 37, constructing a map based on recorded information of the mark and corresponding coordinate values and the coordinate values of the position of each said obstacle after the traversing process is finished, and making marks of the accessible area/unaccessible area on the constructed map according to the area coding information of the mark of each said laser device.

Figure 14:
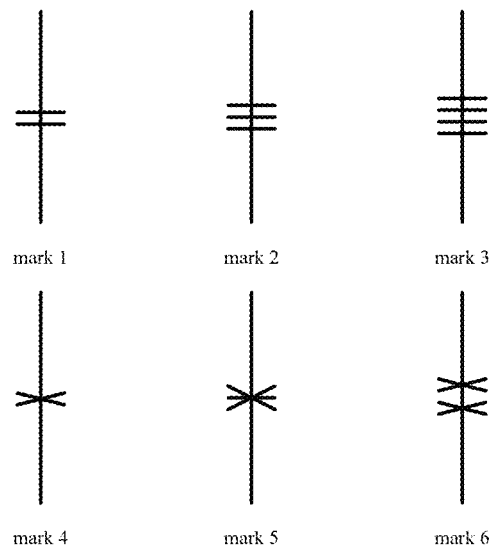
FIG. 14 shows three different marks as the unique encoding information for distinguishing its absolute position and the area coding information for distinguishing accessible area/unaccessible area.

Information of the marks of all the laser devices comprises the unique encoding information and the area coding information. The unique encoding information is represented by different types of specific graphic. The area coding information represents the accessible area by the same shape and represents the unaccessible area by another shape. Referring to FIG. 14, each mark comprises the unique encoding information and the area coding information, and the area coding information is represented by different patterns for distinguishing different laser devices, for example, mark 1 is represented by two short straight lines, mark 2 is represented by three short straight lines, mark 4 is represented by four short straight lines . . . . Meanwhile, accessible area and unaccessible area are represented by two different shapes, for example, indicate the areas is indicated to be accessible when all the lines are parallel with each other, and the area is indicated to be unaccessible when not of all lines are parallel with each other (for example, crossed).

As can be understood, description of the mark rendered above is in a simple way, which is limited thereto.

It can be seen that the present embodiment adds a function on the basis of the embodiment 2. That is, solving the problem of the automatic identification of the unaccessible area (also referred to virtual wall). The conventional method to solve the problem of the robot identification of the unaccessible area mainly adopts the following approaches:

One approach is that an infrared emitting device is set on a boundary of the expected unaccessible area and robot will not cross the boundary if detecting the infrared rays, which is proposed by irobot Company. The disadvantage of the approach is that the infrared emission device needs to be installed with a battery, so as to cause some inconvenience for users, on the other hand, the device is placed near the boundary, so that the device may move and thus fail to function if the device is touched by domestic pets or the like.

Another approach is using magnetic stripe as the boundary proposed by Neato Company, which requires users to attach the magnetic stripe to the boundary of the unaccessible area, which is identified by using Hall sensors. The disadvantage of the approach lies in that the magnetic stripe attached to ground affects the ground appearance. On the other hand, if users want to replace the unaccessible area, it is inconvenient to take off the magnetic stripe.

The area coding information used for distinguishing the accessible area/unaccessible area is arranged in the mark projected by each said laser device according to the present embodiment, wherein the laser device with the area coding information for unaccessible area limits the specific area behind the boundary where the laser device is located as unaccessible area. In this way, when the mobile electronic device identifies the area coding information of the mark, the accessible area/unaccessible area can be distinguished. The mobile electronic device continues to move to avoid the unaccessible area according to the preset avoiding strategy if the unaccessible area is identified. In addition, when the traversal has been finished, marks of the accessible area/unaccessible area are made on the constructed map on basis of the area coding information of the mark of each laser device for the benefit of navigation.

As can be understood, a relation comparison table for area coding information of different marks representing the accessible area/unaccessible area can be set in advance in the mobile electronic device, so that when the area coding information of the mark is acquired, the accessible area or unaccessible area can be identified according the comparison table.

The preset avoiding strategy in the present embodiment is preferably as: making the mobile electronic device retreat by P cm and rotate to the left/right by $Q°$ when the unaccessible area is identified, wherein P is not less than the length of the boundary, $45 \leq Q \leq 90$. Based on the preset avoiding strategy, it basically guarantees that the mobile electronic device can continue to advance to avoid the obstacle.

Furthermore, the boundary between the accessible area and unaccessible area can be identified in the following manners: when the mobile electronic device judges that the area coding information of the mark represents the unaccessible area, the mobile electronic device is moved to find obstacles (the wall) and barrier-free area on the left and right sides of the laser device, and the extension line of the wall is the boundary between the accessible area and unaccessible area.

As can be understood, in addition to the avoiding strategy disclosed herein, the avoiding strategy of the present embodiment can also adopt other approaches, which is not limited thereto.

When performing the method for indoor localization and mapping according to the present embodiment, it is preferable to place one laser device on left side wall or/and right side wall of door frame in each room.

It can be seen that compared with the virtual wall technique according to the prior art, the area coding information used for distinguishing the accessible area and unaccessible area is set in the mark of each said laser device according to the embodiment of the present invention, so that the mobile electronic device may determine the area is accessible after obtaining and identifying the area coding information in the mark. Therefore, the cost is low, and appearance as a whole will not be affected, and it is easy to replace laser device according to the present embodiment.

Figure 4:
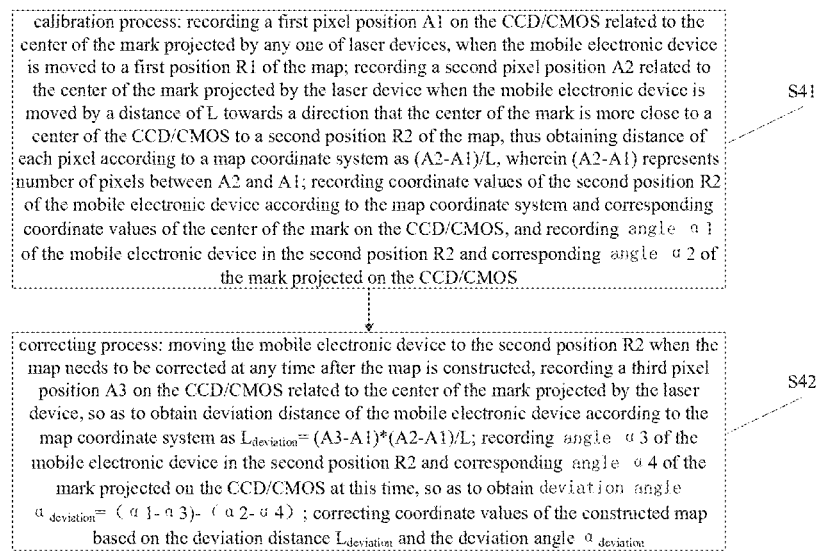
FIG. 4 is a flowchart of a method for map constructing based on light-emitting device according to embodiment 4 of the present invention.

Referring to FIG. 4, it is a flowchart of a method for map constructing according to embodiment 4 of the present invention. When moving direction and moving distance of a robot relative to a starting point are measured in real time by encoder installed on drive axle of the robot, accumulation errors exist in the measurement process of the encoder due to slipping, ambiguous distance between one of the two drive wheels and the ground contact point and the like. In addition, gyroscope drifting can also cause deviations in constructed map. Therefore, on the basis of the foregoing embodiment, the constructed map is corrected to prevent map errors caused by gyroscope drifting or wheel slipping of the mobile electronic device according to the present embodiment, so that the map constructed based on coordinate values is further improved to be more accurate.

Specifically, after constructing a map by performing the foregoing embodiment 1 to embodiment 3, a correction processing is added to a map according to the present embodiment, which specifically comprises:

step 41, calibration process: recording a first pixel position A1 on the CCD/CMOS related to the center of the mark projected by any one of laser devices, when the mobile electronic device is moved to a first position R1 of the map; recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as (A2−A1)/L, wherein (A2−A1) represents number of pixels between A2 and A1; recording coordinate values of the second position R2 of the mobile electronic device according to the map coordinate system and corresponding coordinate values of the center of the mark on the CCD/CMOS, and recording angle α1 of the mobile electronic device in the second position R2 and corresponding angle α2 of the mark projected on the CCD/CMOS; and step 42, correcting process: moving the mobile electronic device to the second position R2 when the map needs to be corrected at any time after the map is constructed, recording a third pixel position A3 on the CCD/CMOS related to the center of the mark projected by the laser device, so as to obtain deviation distance of the mobile electronic device according to the map coordinate system as $L_{deviation}=(A3-A1)*(A2-A1)/L$; recording angle α3 of the mobile electronic device in the second position R2 and corresponding angle α4 of the mark projected on the CCD/CMOS at this time, so as to obtain deviation angle $\alpha_{deviation}=(\alpha1-\alpha3)-(\alpha2-\alpha4)$; correcting coordinate values of the constructed map based on the deviation distance $L_{deviation}$ and the deviation angle $\alpha_{deviation}$.

According to the present embodiment, two coordinate systems are set in the mobile electronic device; one is a map construction coordinate system of the to-be-localized area, and the other is a CCD/CMOS coordinate system of the camera in the mobile electronic device. The CCD/CMOS coordinate system refers to pixel position of the CCD/CMOS onto which a spot mark is projected by laser device, and the CCD/CMOS coordinate system also includes an X axis and a Y axis.

Specifically, the mark includes a position correction mark point and an angle correction mark, and the position correction mark point is located at the center of the entire mark, the angle α1 and the angle α2 are calculated by the following equations:

$$\alpha1=\arctan(y1/x1);$$

$$\alpha2=\arctan(y2/x2);$$

wherein x1 and y1 are respectively pixel differences of the angle correction mark on X-axis and Y-axis of the CCD/CMOS collected by the mobile electronic device arriving at the second position R2 during the calibration process; and x2 and y2 are respectively pixel differences of the angle correction mark collected on the X-axis and the Y-axis of the CCD/CMOS by the mobile electronic device arriving at the second position R2 during the correcting process.

Prior to correcting the constructed map according to the present embodiment, it needs to perform calibration process firstly. For example, for indoor localizing and mapping, the height of each house is different, so that when the mark projected by laser device is deviated by one pixel on the X axis or the Y axis of the CCD/CMOS of the camera, distance of movement of the mobile electronic device in the map coordinate system (i.e., the ground coordinate system) changes, thereby it needs to perform calibration process firstly.

The detailed calibration process is that when the mobile electronic device (for example, a robot) reaches the first position R1 during moving process, the camera detects center of mark projected from the laser device to the CCD/CMOS, as shown as the first pixel position A1 in the FIG. 13. After obtaining the position of the CCD/CMOS corresponding to the mark projected from the laser device, the mobile electronic device is moved towards a direction that the center of the mark is more close to a center of the CCD/CMOS to a second position R2 of the map. When the mobile electronic device moves by certain distance (like 500 millimeters) and arrives at the second position R2. At this point, the position of the CCD/CMOS corresponding to the mark projected from the laser device turns into a second pixel position A2, thus obtaining pixel differences between A1 and A2. By the means that the moving distance in the map coordinate system is divided by the pixel differences, distance of the robot corresponding to one pixel can be calculated in the ground coordinate system. At the same time, coordinate values of the mobile electronic device at the current position (i.e., the second position R2) in the map coordinate system are recorded, and corresponding coordinate values of the center of the mark projected by the laser device onto the CCD/CMOS are recorded. The coordinate values (i.e., of the second position R2) of the mobile electronic device is taken as a reference coordinate point in the correcting process.

Figure 15:
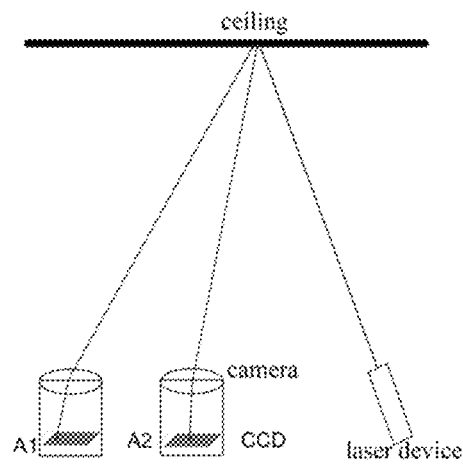
FIG. 15 shows correcting process for the constructed map.
Figure 16:
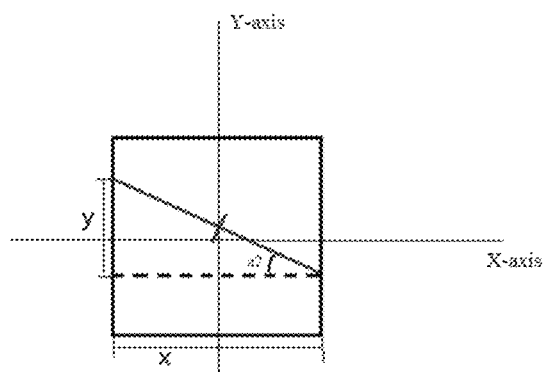
FIG. 16 shows an image of a mark on CCD/CMOS projected by laser device.

The reference coordinate point is used for calibrating the robot position. In order to correct angle, the robot also needs to record angle values: angle α1 of the robot in the second position R2 (the angle α1 can be calculated by a gyroscope) and angle α2 based on pixels of the CCD/CMOS. As shown in FIG. 15, a mark is projected on the ceiling by a laser device. As can be understood, the pattern is not limited to thereto. FIG. 16 is an image of the CCD/CMOS formed by a mark projected by a laser device. In the calibration process, the angle α2 of the mark projected on the CCD/CMOS can be obtained by the following formula:

$$\alpha2=\arctan(y1/x1);$$

wherein x1 and y1 are respectively pixel differences of the angle correction mark on X-axis and Y-axis of the CCD/CMOS collected by the mobile electronic device arriving at the second position R2 during the calibration process;

After the calibration process is completed, when the robot which runs for a period of time (for example, 20 minutes) needs to correct the constructed map, the robot moves to the position where the reference coordinate point is (i.e., the second position R2). By this time, according to differences between any one of the two pixel positions of the CCD/CMOS and the corresponding position previously, it can be known that how many pixels are deviated. By the means that the deviated pixels are multiplied by the distance obtained in the calibration process, it can be determined that how far the robot deviates in the ground coordinate system.

Specifically, when the mobile electronic device is moved to the second position R2, a third pixel position A3 on the CCD/CMOS related to the center of the mark projected by the laser device is recorded, so as to obtain deviation distance of the mobile electronic device according to the map coordinate system as $L_{deviation}=(A3-A1)*(A2-A1)/L$.

When the robot arrives at the second position R2, the current angle α3 of the robot can be calculated by a gyroscope. Meanwhile angle α4 can be calculated by the following equation:

$$\alpha4=\arctan(y2/x2)$$

x2 and y2 are respectively pixel differences of the angle correction mark collected on the X-axis and the Y-axis of the CCD/CMOS by the mobile electronic device arriving at the second position R2 during the correcting process.

Consequently, deviation angle is as $\alpha_{deviation}=(\alpha1-\alpha3)-(\alpha2-\alpha4)$. At this point, coordinate values of the constructed map is corrected based on the deviation distance $L_{deviation}$ and the deviation angle $\alpha_{deviation}$, so as to obtain corrected map.

Figure 5:
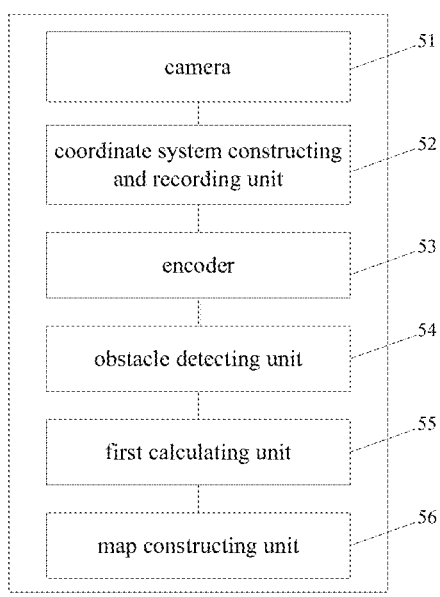
FIG. 5 is composition block diagram of an apparatus for map constructing based on light-emitting device according to embodiment 5 of the present invention.

Referring to FIG. 5, it is composition block diagram of an apparatus for map constructing according to embodiment 5 of the present invention. The apparatus for map constructing is a mobile electronic device or arranged in a mobile electronic device, which is applicable for real-time mapping of a to-be-localized area provided with at least one laser device. The mobile electronic device can be, for example, a robot.

The apparatus for map constructing comprises:

a camera 51, configured to collect mark projected by laser device;

a coordinate system constructing and recording unit 52, configured to take a position of a mobile electronic which is moving along a certain trajectory as a coordinate origin of a map coordinate system, when a center of a mark projected by a first laser device and collected by the camera 51 of a mobile electronic device coincides with central point of CCD/CMOS, and recording information of the mark of the first laser device and corresponding coordinate values;

an encoder 53, configured to record a moving distance and a moving direction of the mobile electronic device relative to a starting point in real time through gyroscope when the mobile electronic device traverses the entire to-be-localized area with the coordinate origin as the starting point;

an obstacle detecting unit 54, configured to detect obstacles;

a first calculating unit 55, configured to calculate coordinate values of the location of each said obstacle based on the moving direction and the moving distance of the mobile electronic device relative to the starting point recorded by the encoder 53 when the mobile electronic device detects any one of the obstacle, and send the calculated coordinate values to the coordinate system constructing and recording unit 52; and a map constructing unit 56, configured to construct a map according to information of mark and corresponding coordinate values and the coordinate values of the location of each said obstacle recorded by the coordinate system constructing and recording unit 52.

The operation principle and working process of the apparatus for map constructing according to the present embodiment can be referred to the embodiment 1, which will not be repeated thereto.

The obstacle detecting unit 54 comprises a collision sensor/a laser sensor/an infrared sensor:

The obstacle is sensed by using a collision sensor, and current coordinate values of the mobile electronic device are taken as coordinate values of a position of an obstacle when the collision sensor senses a collision with the obstacle;

The collision sensor component is used to sense a collision event of the mobile electronic device with external environment. The collision sensor component includes, but is not limited to, eccentric hammer sensors, ball-type crash sensors, roller-type expansion sensors, mercury-switched crash sensors, piezoresistive effect type crash sensors, piezoelectric effect type impact sensors, microswitches and the like.

The obstacle is detected by using a laser sensor/infrared sensor, and the position of the obstacle relative to the current location of the mobile electronic device is calculated on the basis of a laser/infrared distance calculating principle when the laser sensor/infrared sensor detects the obstacle, thus the coordinate values of the position of the obstacle is calculated.

According to the present embodiment, preferably, the mobile electronic device further comprises: a collision strategy unit, configured to enable the mobile electronic device to continue to advance to avoid the obstacle according to a preset collision strategy, when the mobile electronic device has collided with an obstacle during the traversing process.

The operation principle and working process of the collision strategy unit can be referred to the embodiment 1.

Figure 6:
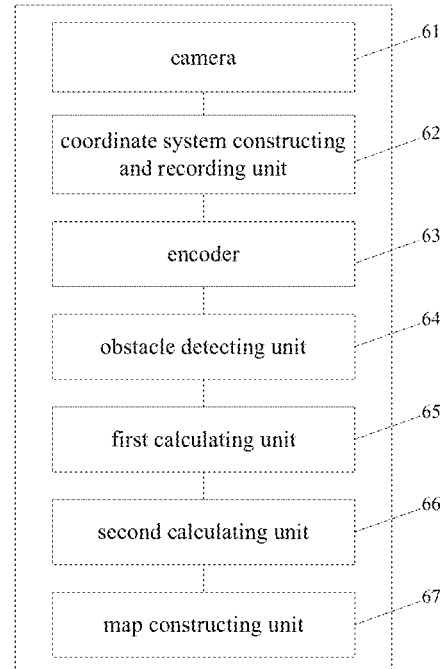
FIG. 6 is composition block diagram of an apparatus for map constructing based on light-emitting device according to embodiment 6 of the present invention.

According to another preferable embodiment of the present invention, referring to FIG. 6, the apparatus for map constructing is a mobile electronic device or arranged in a mobile electronic device, which is applicable for real-time mapping of a to-be-localized area provided with two or more laser devices, Each said laser device is arranged at a specific position of the to-be-localized area, and information of the mark projected by each said laser device includes unique encoding information for distinguishing its absolute position. The unique encoding information is represented by different types of specific graphic. The mobile electronic device can be, for example, a robot.

The apparatus for map constructing comprises:

a camera 61, configured to collect mark projected by laser device;

a coordinate system constructing and recording unit 62, configured to take a position of a mobile electronic which is moving along a certain trajectory as a coordinate origin of a map coordinate system, when a center of a mark projected by a first laser device and collected by the camera 61 of a mobile electronic device coincides with central point of CCD/CMOS, and recording information of the mark of the first laser device and corresponding coordinate values;

an encoder 63, configured to record a moving distance and a moving direction of the mobile electronic device relative to a starting point in real time through gyroscope when the mobile electronic device traverses the entire to-be-localized area with the coordinate origin as the starting point;

an obstacle detecting unit 64, configured to detect obstacles;

a first calculating unit 65, configured to calculate coordinate values of the location of each said obstacle based on the moving direction and the moving distance of the mobile electronic device relative to the starting point recorded by the encoder 63 when the mobile electronic device detects any one of the obstacle, and send the calculated coordinate values to the coordinate system constructing and recording unit 62;

a second calculating unit 66, configured to calculate coordinate values of other laser device except the first laser device based on a moving direction and a moving distance of the mobile electronic device relative to the starting point during the traversing process, when a center of a mark projected by the other laser device and collected by the camera 61 of the mobile electronic device coincides with the central point of the CCD/CMOS, send information of the mark of the other laser device and corresponding coordinate values to the coordinate system constructing and recording unit; and a map constructing unit 67, configured to construct a map according to information of the mark and corresponding coordinate values and the coordinate values of the location of each said obstacle recorded by the coordinate system constructing and recording unit 62.

The operation principle and working process of the apparatus for map constructing according to the present embodiment can be referred to the embodiment 2, which will not be repeated thereto.

Referring to FIG. 7, it is composition block diagram of an apparatus for map constructing according to embodiment 7 of the present invention. The apparatus for map constructing is a mobile electronic device or arranged in a mobile electronic device, which is applicable for real-time mapping of a to-be-localized area provided with two or more laser devices. Each said laser device is arranged at a specific position of the to-be-localized area, and information of mark projected by each said laser device includes unique encoding information for distinguishing its absolute position and area coding information for distinguishing accessible area/unaccessible area. Specific area behind a boundary where the laser device directly emitting the area coding information of the unaccessible area is located is limited as unaccessible area. The unique encoding information is represented by different types of specific graphic. The area coding information represents the accessible area by the same shape and represents the unaccessible area by another shape. The mobile electronic device can be, for example, a robot.

The apparatus for map constructing comprises:

a camera 71, configured to collect mark projected by laser device;

a coordinate system constructing and recording unit 72, configured to take a position of a mobile electronic which is moving along a certain trajectory as a coordinate origin of a map coordinate system, when a center of a mark projected by a first laser device and collected by the camera 71 of a mobile electronic device coincides with central point of CCD/CMOS, and recording information of the mark of the first laser device and corresponding coordinate values;

an encoder 73, configured to record a moving distance and a moving direction of the mobile electronic device relative to a starting point in real time through gyroscope when the mobile electronic device traverses the entire to-be-localized area with the coordinate origin as the starting point;

an obstacle detecting unit 74, configured to detect obstacles;

a first calculating unit 75, configured to calculate coordinate values of the location of each said obstacle based on the moving direction and the moving distance of the mobile electronic device relative to the starting point recorded by the encoder when the mobile electronic device detects any one of the obstacle, and send the calculated coordinate values to the coordinate system constructing and recording unit 72;

a second calculating unit 76, configured to calculate coordinate values of other laser device except the first laser device based on a moving direction and a moving distance of the mobile electronic device relative to the starting point during the traversing process, when a center of a mark projected by the other laser device and collected by the camera of the mobile electronic device coincides with the central point of the CCD/CMOS, send information of the mark of the other laser device and corresponding coordinate values to the coordinate system constructing and recording unit;

area identifying unit 77, configured to identify whether the area coding information in the information of the mark represents accessible area or unaccessible area once the mobile electronic device obtains information of any mark projected by one of laser devices;

As can be understood, a relation comparison table for different area coding information of the laser device representing the accessible area/unaccessible area can be set in advance in the mobile electronic device, so that when the area coding information of the mark is acquired, the accessible area or unaccessible area can be identified according the comparison table.

avoiding strategy unit 78, configured to move the mobile electronic device to avoid the unaccessible area according a preset avoiding strategy if the unaccessible area is identified by the area identifying unit 77; and a map constructing unit 79, configured to construct a map according to information of the mark and corresponding coordinate values and the coordinate values of the location of each said obstacle recorded by the coordinate system constructing and recording unit 72, and make marks of the accessible area/unaccessible area on the constructed map according to the area coding information of the mark.

The apparatus for map constructing in the present embodiment effectively solves the problem of automatically identifying unaccessible area (also referred to a virtual wall) exiting in the prior art, of which the operation principle and working process can be referred to the embodiment 3.

Referring to FIG. 8, it is composition block diagram of an apparatus for map constructing according to embodiment 8 of the present invention. On the basis of any one of apparatuses in the embodiments 5~7, the present apparatus further comprises:

a calibration unit 81, configured to record a first pixel position A1 on the CCD/CMOS related to the center of the mark projected by any one of laser devices, when the mobile electronic device is moved to a first position R1 of the map; recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as (A2−A1)/L, wherein (A2−A1) represents number of pixels between A2 and A1; recording coordinate values of the second position R2 of the mobile electronic device according to the map coordinate system and corresponding coordinate values of the center of the mark on the CCD/CMOS, and recording angle α1 of the mobile electronic device in the second position R2 and corresponding angle α2 of the mark projected on the CCD/CMOS; and a correcting unit 82, configured to move the mobile electronic device to the second position R2 when the map needs to be corrected at any time after the map is constructed, recording a third pixel position A3 on the CCD/CMOS related to the center of the mark projected by the laser device, so as to obtain deviation distance of the mobile electronic device according to the map coordinate system as $L_{deviation}=(A3-A1)*(A2-A1)/L$; recording angle α3 of the mobile electronic device in the second position R2 and corresponding angle α4 of the mark projected on the CCD/CMOS at this time, so as to obtain deviation angle $α_{deviation}=(α1-α3)-(α2-α4)$; correcting coordinate values of the constructed map based on the deviation distance $L_{deviation}$ and the deviation angle $α_{deviation}$.

The operation principle and working process of the apparatus for map constructing according to the present embodiment can be referred to the embodiment 4, which will not be repeated thereto.

The present invention further discloses a smart mobile electronic device, which comprises a mobile electronic device and an apparatus for map constructing of any embodiment as shown in FIG. 5~FIG. 8.

Referring to FIG. 9, it is a flowchart of a method for map correcting according to embodiment 9 of the present invention. The method comprises:

step 91, calibration step: recording a first pixel position A1 on CCD/CMOS related to a center of a mark projected by any one of laser devices, when a mobile electronic device is moved to a first position R1 of a map; recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as (A2−A1)/L, wherein (A2−A1) represents number of pixels between A2 and A1; recording coordinate values of the second position R2 of the mobile electronic device according to the map coordinate system and corresponding coordinate values of the center of the mark on the CCD/CMOS, and recording angle α1 of the mobile electronic device in the second position R2 and corresponding angle α2 of the mark projected on the CCD/CMOS; and step 92, correcting step: moving the mobile electronic device to the second position R2 when the map needs to be corrected at any time after the map is constructed, recording a third pixel position A3 on the CCD/CMOS related to the center of the mark projected by the laser device, so as to obtain deviation distance of the mobile electronic device according to the map coordinate system as $L_{deviation}=(A3-A1)*(A2-A1)/L$; recording angle α3 of the mobile electronic device in the second position R2 and corresponding angle α4 of the mark projected on the CCD/CMOS at this time, so as to obtain deviation angle $\alpha_{deviation}=(\alpha1-\alpha3)-(\alpha2-\alpha4)$; correcting coordinate values of the constructed map based on the deviation distance $L_{deviation}$ and the deviation angle $\alpha_{deviation}$.

The mark includes a position correction mark point and an angle correction mark, and the position correction mark point is located at the center of the entire mark, the angle α1 and the angle α2 are calculated by the following equations:

$$\alpha2=\arctan(y1/x1);$$

$$\alpha4=\arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

Preferably, in the present embodiment, the mobile electronic is robot.

As can be understood, the map is constructed with any one of methods for map constructing according to embodiment 1 to embodiment 4.

The operation principle and working process of the apparatus for map correcting according to the present embodiment can be referred to the embodiment 4, which will not be repeated thereto.

Referring to FIG. 10, it is a flowchart of a method for map correcting according to embodiment 10 of the present invention. The method comprises:

step 101, moving a mobile electronic device to a reference coordinate point obtained in initial calibration process, recording a current pixel position A3 related to a center of a mark projected by any one of laser devices, calculating deviation distance of the mobile electronic device according to a map coordinate system as $L_{deviation}=(A3-A1)*L'$, based on distance of each pixel L' according to the map coordinate system obtained in the initial calibration process and pixel differences between the current pixel position A3 and reference pixel position A2 obtained in the initial calibration process;

step 102, recording angle α3 of the mobile electronic device at the reference coordinate point and corresponding angle α4 of the mark projected on the CCD/CMOS at this time, obtaining deviation angle $\alpha_{deviation}=(\alpha1-\alpha3)-(\alpha2-\alpha4)$ based on angle α1 of the mobile electronic device at the reference coordinate point and corresponding angle α2 of the mark projected on the CCD/CMOS recorded in the initial calibration process; and step 103, correcting coordinate values on the constructed map based on the deviation distance $L_{deviation}$ and the deviation angle $\alpha_{deviation}$.

The initial calibration process is as follows:

(1) recording a first pixel position A1 on the CCD/CMOS related to the center of the mark projected by any one of the laser devices, when the mobile electronic device is moved to a first position R1 of a map;

(2) recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as $L'=(A2-A1)/L$, wherein (A2−A1) represents number of pixels between A2 and A1;

(3) recording coordinate values of the second position R2 of the mobile electronic device according to the map coordinate system and corresponding coordinate values of the center of the mark on the CCD/CMOS; the second position R2 is the reference coordinate point; and (4) recording angle α1 of the mobile electronic device in the second position R2 and angle α2 of the mark projected on the CCD/CMOS.

The mark includes a position correction mark point and an angle correction mark, and the position correction mark point is located at the center of the entire mark, the angle α1 and the angle α2 are calculated by the following equations:

$$\alpha2=\arctan(y1/x1);$$

$$\alpha4=\arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

Preferably, in the present embodiment, the mobile electronic is a robot.

As can be understood, the map is constructed with any one of methods for map constructing according to embodiment 1 to embodiment 4.

The operation principle and working process of the apparatus for map correcting according to the present embodiment can be referred to the embodiment 4, which will not be repeated thereto.

Referring to FIG. 11, it is composition block diagram of an apparatus for map correcting, wherein the apparatus comprises:

a calibration unit 111, configure to record a first pixel position A1 on CCD/CMOS related to a center of a mark projected by any one of laser devices, when a mobile electronic device is moved to a first position R1 of a map; recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as (A2−A1)/L, wherein (A2−A1) represents number of pixels between A2 and A1; recording coordinate values of the second position R2 of the mobile electronic device according to the map coordinate system and corresponding coordinate values of the center of the mark on the CCD/CMOS, and recording angle α1 of the mobile electronic device in the second position R2 and corresponding angle α2 of the mark projected on the CCD/CMOS; and a correcting unit 112, configure to move the mobile electronic device to the second position R2 when the map needs to be corrected at any time after the map is constructed, recording a third pixel position A3 on the CCD/CMOS related to the center of the mark projected by the laser device, so as to obtain deviation distance of the mobile electronic device according to the map coordinate system as $L_{deviation}=(A3-A1)*(A2-A1)/L$; recording angle α3 of the mobile electronic device in the second position R2 and corresponding angle α4 of the mark projected on the CCD/CMOS at this time, so as to obtain deviation angle $\alpha_{deviation}=(\alpha1-\alpha3)-(\alpha2-\alpha4)$; correcting coordinate values of the constructed map based on the deviation distance $L_{deviation}$ and the deviation angle $\alpha_{deviation}$.

The mark includes a position correction mark point and an angle correction mark, and the position correction mark point is located at the center of the entire mark, the angle α1 and the angle α2 are calculated by the following equations:

$$\alpha2=\arctan(y1/x1);$$

$$\alpha4=\arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

Preferably, in the present embodiment, the mobile electronic is a robot.

As can be understood, the map is constructed by any one of apparatuses for map constructing according to embodiment 5 to embodiment 8.

Referring to FIG. 12, it is composition block diagram of an apparatus for map correcting according to embodiment 12, wherein the apparatus comprises:

deviation distance calculating unit 121, configured to move a mobile electronic device to a reference coordinate point obtained in initial calibration process, recording a current pixel position A3 related to a center of a mark projected by any one of laser devices, calculating deviation distance of the mobile electronic device according to a map coordinate system as $L_{deviation}=(A3-A1)*L'$, based on distance of each pixel L' according to the map coordinate system obtained in the initial calibration process and pixel differences between the current pixel position A3 and reference pixel position A2 obtained in the initial calibration process;

a deviation angle calculating unit 122, configured to record angle α3 of the mobile electronic device at the reference coordinate point and corresponding angle α4 of the mark projected on the CCD/CMOS at this time, obtaining deviation angle $\alpha_{deviation}=(\alpha1-\alpha3)-(\alpha2-\alpha4)$ based on angle α1 of the mobile electronic device at the reference coordinate point and corresponding angle α2 of the mark projected on the CCD/CMOS recorded in the initial calibration process; and a correcting unit 123, configured to correct coordinate values on the constructed map based on the deviation distance $L_{deviation}$ and the deviation angle $\alpha_{deviation}$.

The initial calibration process is as follows:

(1) recording a first pixel position A1 on the CCD/CMOS related to the center of the mark projected by any one of the laser devices, when the mobile electronic device is moved to a first position R1 of a map;

(2) recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as $L'=(A2-A1)/L$, wherein (A2−A1) represents number of pixels between A2 and A1;

(3) recording coordinate values of the second position R2 of the mobile electronic device according to the map coordinate system and corresponding coordinate values of the center of the mark on the CCD/CMOS; the second position R2 is the reference coordinate point; and (4) recording angle α1 of the mobile electronic device in the second position R2 and angle α2 of the mark projected on the CCD/CMOS.

The mark includes a position correction mark point and an angle correction mark, and the position correction mark point is located at the center of the entire mark, the angle α1 and the angle α2 are calculated by the following equations:

$$\alpha2=\arctan(y1/x1);$$

$$\alpha4=\arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

Preferably, in the present embodiment, the mobile electronic is a robot.

As can be understood, the map is constructed by any one of apparatuses for map constructing according to embodiment 5 to embodiment 8.

The operation principle and working process of the apparatus for map correcting according to the present embodiment can be referred to the embodiment 4, which will not be repeated thereto.

It should be explained that according to the present description, the term "comprise", "include" or any other variant thereof which is intended to encompass the non-exclusive, so that the process, method, objects or apparatus comprising a series of elements includes not only those elements, but also includes other elements which are not explicitly listed, or further includes the elements that are inherent in such processes, methods, objects or devices. In the absence of more restrictions, the elements defined by the statements "comprise . . . " do not preclude the presence of additional identical elements in the process, methods, objects or devices that includes the listed elements.

Finally, it should be noted as well that the above-mentioned series of processing includes not only the processing performed according to time sequence in the order described herein, but also the processing performed in parallel or separately, rather than in chronological order. With the description of the above embodiments, it will be apparent to persons having ordinary skill in the art that the present invention may be implemented by means of software and necessary hardware platforms, and may be implemented only by software for sure. Based on this understanding, all or parts of the technical solution of the present invention that contributes to the background art may be embodied in the form of software product, which can be stored in a storage medium such as ROM/RAM, magnetic disk, optical disk and so on, which is including a number of instructions for enabling a computer device (which may be a personal computer, a server, or a network device and so on) to perform the methods described in certain parts of the embodiments or each embodiment of the present invention.

The foregoing descriptions are merely exemplary embodiments of the present invention, but are not intended to limit the present disclosure. Any modifications, equivalent substitutions, and improvements made by those skilled in the art within the spirit and principle of the present disclosure shall fall within the protection scope of the present disclosure.

What is claimed is:

1. A method for map constructing, applicable for real-time mapping of a to-be-localized area provided with at least one laser device, and the method comprises steps of:
    taking a position of a mobile electronic device which is moving along a certain trajectory as a coordinate origin of a map coordinate system, when a center of a mark projected by a first laser device and collected by a camera of the mobile electronic device coincides with central point of CCD/CMOS, and recording information of the mark of the first laser device and corresponding coordinate values;
    moving the mobile electronic device with the coordinate origin as a starting point to traverse the entire to-be-localized area, calculating and recording coordinate values of a position of one of obstacles each time when it is detected by the mobile electronic device based on a moving direction and a moving distance of the mobile electronic device relative to the starting point during a traversing process; and
    constructing a map based on recorded information of the mark and corresponding coordinate values and the coordinate values of the position of each said obstacle after the traversing process is finished.

2. The method for map constructing according to claim 1, wherein the number of laser devices is two or more, and each said laser devices is disposed at a specific position of the to-be-localized area, and the information of the mark projected by each said laser device includes unique encoding information for distinguishing its absolute position; the unique code information is represented by a specific graphic; and the method further comprises step of:
    calculating coordinate values of other laser device except the first laser device based on a moving direction and a moving distance of the mobile electronic device relative to the starting point during the traversing process, when a center of a mark projected by the other laser device and collected by the camera of the mobile electronic device coincides with the central point of the CCD/CMOS, recording information of the mark of the other laser device and corresponding coordinate values.

3. The method for map constructing according to claim 2, wherein the method further comprises step of:
    calibration process: recording a first pixel position A1 on the CCD/CMOS related to the center of the mark projected by any one of laser devices, when the mobile electronic device is moved to a first position R1 of the map; recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as (A2−A1)/L, wherein (A2−A1) represents number of pixels between A2 and A1; recording coordinate values of the second position R2 of the mobile electronic device according to the map coordinate system and corresponding coordinate values of the center of the mark on the CCD/CMOS, and recording angle $\alpha 1$ of the mobile electronic device in the second position R2 and corresponding angle $\alpha 2$ of the mark projected on the CCD/CMOS;
    correcting process: moving the mobile electronic device to the second position R2 when the map needs to be corrected at any time after the map is constructed, recording a third pixel position A3 on the CCD/CMOS related to the center of the mark projected by the laser device, so as to obtain deviation distance of the mobile electronic device according to the map coordinate system as $L_{deviation}=(A3−A1)*(A2−A1)/L$; recording angle $\alpha 3$ of the mobile electronic device in the second position R2 and corresponding angle $\alpha 4$ of the mark projected on the CCD/CMOS at this time, so as to obtain deviation angle $\alpha_{deviation}=(\alpha 1−\alpha 3)−(\alpha 2−\alpha 4)$; correcting coordinate values of the constructed map based on the deviation distance $L_{deviation}$ and the deviation angle $\alpha_{deviation}$.

4. The method for map constructing according to claim 3, wherein the mark includes a position correction mark point and an angle correction mark, and the position correction mark point is located at the center of the entire mark, the angle $\alpha 1$ and the angle $\alpha 2$ are calculated by the following equations:

$$\alpha 2 = \arctan(y1/x1);$$

$$\alpha 4 = \arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

5. The method for map constructing according to claim 4, wherein the position correction mark point is a short line and the angle correction mark is a long line.

6. The method for map constructing according to claim 1, wherein the mobile electronic device is a robot.

7. The method for map constructing according to claim 1, wherein the method is applicable for real-time map constructing of indoor to-be-localized area; or/and the laser device is suitable to be mounted on wall, ceiling or doorframe.

8. A method for map correcting, wherein the method comprises:

moving a mobile electronic device to a reference coordinate point obtained in an initial calibration process, recording a current pixel position A3 related to a center of a mark projected by any one of laser devices, calculating deviation distance of the mobile electronic device according to a map coordinate system as $L_{deviation}=(A3-A1)*L'$, based on distance of each pixel L' according to the map coordinate system obtained in the initial calibration process and pixel differences between the current pixel position A3 and reference pixel position A2 obtained in the initial calibration process;

recording angle α3 of the mobile electronic device at the reference coordinate point and corresponding angle α4 of the mark projected on the CCD/CMOS at this time, obtaining deviation angle $α_{deviation}=(α1-α3)-(α2-α4)$ based on angle α1 of the mobile electronic device at the reference coordinate point and corresponding angle α2 of the mark projected on the CCD/CMOS recorded in the initial calibration process; and correcting coordinate values on the constructed map based on the deviation distance $L_{deviation}$ and the deviation angle $α_{deviation}$.

9. The method for map correcting according to claim 8, wherein the initial calibration process follows:

recording a first pixel position A1 on the CCD/CMOS related to the center of the mark projected by any one of the laser devices, when the mobile electronic device is moved to a first position R1 of a map;

recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as L'=(A2−A1)/L, wherein (A2−A1) represents number of pixels between A2 and A1;

recording coordinate values of the second position R2 of the mobile electronic device according to the map coordinate system and corresponding coordinate values of the center of the mark on the CCD/CMOS; the second position R2 is the reference coordinate point; and recording angle α1 of the mobile electronic device in the second position R2 and angle α2 of the mark projected on the CCD/CMOS.

10. The method for map correcting according to claim 8, wherein the mark includes a position correction mark point and an angle correction mark, and the position correction mark point is located at the center of the entire mark, the angle α1 and the angle α2 are calculated by the following equations:

$$α2=\arctan(y1/x1);$$

$$α4=\arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

11. The method for map correcting according to claim 10, wherein the position correction mark point is a short line and the angle correction mark is a long line.

12. An apparatus for map constructing, wherein the apparatus comprises:

a camera, configured to collect mark projected by laser device;

a coordinate system constructing and recording unit, configured to take a position of a mobile electronic which is moving along a certain trajectory as a coordinate origin of a map coordinate system, when a center of a mark projected by a first laser device and collected by the camera of a mobile electronic device coincides with central point of CCD/CMOS, and recording information of the mark of the first laser device and corresponding coordinate values;

an encoder, configured to record a moving distance and a moving direction of the mobile electronic device relative to a starting point in real time through gyroscope when the mobile electronic device traverses the entire to-be-localized area with the coordinate origin as the starting point;

an obstacle detecting unit, configured to detect obstacles;

a first calculating unit, configured to calculate coordinate values of the location of each said obstacle based on the moving direction and the moving distance of the mobile electronic device relative to the starting point recorded by the encoder when the mobile electronic device detects any one of the obstacle, and send the calculated coordinate values to the coordinate system constructing and recording unit; and a map constructing unit, configured to construct a map according to information of mark and corresponding coordinate values and the coordinate values of the location of each said obstacle recorded by the coordinate system constructing and recording unit.

13. The apparatus for map constructing according to claim 12, wherein the number of laser devices is two or more, and each said laser devices is disposed at a specific position of the to-be-localized area, and the information of the mark projected by each said laser device includes unique encoding information for distinguishing its absolute position; the unique code information is represented by a specific graphic; the apparatus further comprises:

a second calculating unit, configured to calculate coordinate values of other laser device except the first laser device based on a moving direction and a moving distance of the mobile electronic device relative to the starting point during the traversing process, when a center of a mark projected by the other laser device and collected by the camera of the mobile electronic device coincides with the central point of the CCD/CMOS, send the information of the mark of the other laser device and corresponding coordinate values to the coordinate system constructing and recording unit.

14. The apparatus for map constructing according to claim 13, wherein the apparatus further comprises:

a calibration unit: configured to record a first pixel position A1 on the CCD/CMOS related to the center of the mark projected by any one of laser devices, when the mobile electronic device is moved to a first position R1 of the map; recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as (A2−A1)/L, wherein (A2−A1) represents number of pixels between A2 and A1; recording coordinate values of the second position R2 of the mobile electronic device according to the map coordinate system and corresponding coordinate values of the center of the mark on the CCD/CMOS, and recording angle α1 of the mobile electronic device in the second position R2 and corresponding angle α2 of the mark projected on the CCD/CMOS; and a correcting unit: configured to move the mobile electronic device to the second position R2 when the map needs to be corrected at any time after the map is constructed, recording a third pixel position A3 on the CCD/CMOS related to the center of the mark projected by the laser device, so as to obtain deviation distance of the mobile electronic device according to the map coordinate system as $L_{deviation}=(A3-A1)*(A2-A1)/L$; recording angle α3 of the mobile electronic device in the second position R2 and corresponding angle α4 of the mark projected on the CCD/CMOS at this time, so as to obtain deviation angle $\alpha_{deviation}=(\alpha1-\alpha3)-(\alpha2-\alpha4)$; correcting coordinate values of the constructed map based on the deviation distance $L_{deviation}$ and the deviation angle $\alpha_{deviation}$.

15. The apparatus for map constructing according to claim 14, wherein the mark includes a position correction mark point and an angle correction mark, and the position correction mark point is located at the center of the entire mark, the angle α1 and the angle α2 are calculated by the following equations:

$$\alpha1=\arctan(y1/x1);$$

$$\alpha2=\arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

16. The apparatus for map constructing according to claim 15, wherein the position correction mark point is a short line and the angle correction mark is a long line.

17. An apparatus for map correcting, wherein the apparatus comprises:

a deviation distance calculating unit, configured to move a mobile electronic device to a reference coordinate point obtained in initial calibration process, recording a current pixel position A3 related to a center of a mark projected by any one of laser devices, calculating deviation distance of the mobile electronic device according to a map coordinate system as $L_{deviation}=(A3-A1)*L'$, based on distance of each pixel L' according to the map coordinate system obtained in the initial calibration process and pixel differences between the current pixel position A3 and reference pixel position A2 obtained in the initial calibration process;

a deviation angle calculating unit, configured to record angle α3 of the mobile electronic device at the reference coordinate point and corresponding angle α4 of the mark projected on the CCD/CMOS at this time, obtaining deviation angle $\alpha_{deviation}=(\alpha1-\alpha3)-(\alpha2-\alpha4)$ based on angle α1 of the mobile electronic device at the reference coordinate point and corresponding angle α2 of the mark projected on the CCD/CMOS recorded in the initial calibration process;

a correcting unit, configured to correct coordinate values on the constructed map based on the deviation distance $L_{deviation}$ and the deviation angle $\alpha_{deviation}$.

18. The apparatus for map correcting according to claim 17, wherein the initial calibration process follows:

recording a first pixel position A1 on the CCD/CMOS related to the center of the mark projected by any one of the laser devices, when the mobile electronic device is moved to a first position R1 of a map;

recording a second pixel position A2 related to the center of the mark projected by the laser device when the mobile electronic device is moved by a distance of L towards a direction that the center of the mark is more close to a center of the CCD/CMOS to a second position R2 of the map, thus obtaining distance of each pixel according to a map coordinate system as $L'=(A2-A1)/L$, wherein (A2−A1) represents number of pixels between A2 and A1;

recording coordinate values of the second position R2 of the mobile electronic device according to the map coordinate system and corresponding coordinate values of the center of the mark on the CCD/CMOS; the second position R2 is the reference coordinate point; and recording angle α1 of the mobile electronic device in the second position R2 and angle α2 of the mark projected on the CCD/CMOS.

19. The apparatus for map correcting according to claim 17, wherein the mark includes a position correction mark point and an angle correction mark, and the position correction mark point is located at the center of the entire mark, the angle α1 and the angle α2 are calculated by the following equations:

$$\alpha1=\arctan(y1/x1);$$

$$\alpha2=\arctan(y2/x2);$$

wherein x1 and y1 are respectively pixel differences of the angle correction mark on X-axis and Y-axis of the CCD/CMOS collected by the mobile electronic device arriving at the second position R2 during the calibration process;

x2 and y2 are respectively pixel differences of the angle correction mark collected on the X-axis and the Y-axis of the CCD/CMOS by the mobile electronic device arriving at the second position R2 during the correcting process.

20. The apparatus for map correcting according to claim 19, wherein the position correction mark point is a short line and the angle correction mark is a long line.

* * * * *